United States Patent [19]

Vroomans

[11] 4,296,023

[45] Oct. 20, 1981

[54] VINYL CHLORIDE POLYMER COMPOSITIONS WITH REDUCED COMBUSTIBILITY AND REDUCED SMOKE FORMATION UNDER CONDITIONS OF FIRE

[75] Inventor: Hubertus J. Vroomans, Beek, Netherlands

[73] Assignee: Stamicarbon, B.V., Geleen, Netherlands

[21] Appl. No.: 154,898

[22] Filed: May 30, 1980

[30] Foreign Application Priority Data

Jun. 1, 1979 [NL] Netherlands .......................... 7904369
Jun. 27, 1979 [NL] Netherlands .......................... 7904991
Oct. 17, 1979 [NL] Netherlands .......................... 7907651

[51] Int. Cl.$^3$ .............................................. C08K 3/24
[52] U.S. Cl. ............................................... 260/45.75 F
[58] Field of Search ................................. 260/45.75 F

[56] References Cited

U.S. PATENT DOCUMENTS 3,901,850  8/1975  Kurtz .......................... 260/45.75 W
3,928,502  12/1975  Fabris et al. ................. 260/45.75 B

OTHER PUBLICATIONS

Journal of the Ceramic Society–vol. 44, No. 10, Oct. 1961, pp. 493 to 499.

*Primary Examiner*—V. P. Hoke
*Attorney, Agent, or Firm*—Cushman, Darby & Cushman

[57] ABSTRACT

The invention pertains to vinyl chloride polymer compositions with an oxygen index according to ASTM D 2863 of at least 60 and reduced smoke formation under conditions of fire. This is achieved in that the composition contains 0.05–5 parts by weight per 100 parts by weight of vinyl chloride polymer of a zinc titanate that consists to a large extent of zinc titanate possessing the spinel structure.

8 Claims, No Drawings

VINYL CHLORIDE POLYMER COMPOSITIONS WITH REDUCED COMBUSTIBILITY AND REDUCED SMOKE FORMATION UNDER CONDITIONS OF FIRE

The invention relates to vinyl chloride polymer compositions with an oxygen index according to ASTM D 2863 of at least 60 and reduced smoke formation under conditions of fire.

There is an increasing need for improved plastic compositions that are safer under conditions of fire. Although vinyl chloride polymers are in themselves already not easily combustible, increasingly higher demands are being set on vinyl chloride polymer compositions, too, as regards their behaviour and degree of smoke formation under fire conditions.

Vinyl chloride polymer compositions are used on an extensive scale in building constructions and also for upholstery, wall covering and the like, and are consequently often present in large amounts in areas open to the public, such as public buildings and means of transport.

In view of this, the safety regulations have been sharpened continually, and high demands are made as to the fire resistance and the smoke formation of such compositions under fire conditions.

A measure of the fire resistance is the oxygen index, measured according to ASTM D 2863. The value thereof is the percentage of oxygen in an oxygen-nitrogen mixture that under accurately defined conditions will just support combustion of a sample of a plastic composition.

A measure of the smoke formation is obtained by introducing the smoke formed in combustion in an atmosphere containing 0.5% more oxygen than the oxygen content measured according to ASTM D 2863 into a smoke chamber, and determining the light transmission of the smoke-containing atmosphere. The optical density is defined as log $L_o$-log L per gram of polymer composition, where L is the light transmission in percents of the smoke-containing atmosphere and L the light transmission subsequently measured for the smoke-free atmosphere. $L_o$ constitutes the correction for soot deposited on the glass windows of the smoke chamber. The light transmission of the clean apparatus for conducting the smoke formation test is taken to be 100%. The quantity thus measured, calculated per gram of polymer composition, is termed the specific optical density.

For a number of vinyl chloride polymer compositions it is now required that the oxygen index thereof be at least 60. The smoke formation in combustion should, in addition, be as low as possible. Vinyl chloride polymer compositions to which no flame-retarding or fire-resisting agents have been added generally do not satisfy the requirement of having an oxygen index of above 60.

A number of materials have been proposed and applied as fire-resisting additives in vinyl chloride polymers. However, many have an adverse effect on the processing and the physical properties of vinyl chloride polymers, often also because a fairly large amount of such additives is to be used to achieve the desired results.

Vinyl chloride polymer compositions have now been found with an oxygen index according to ASTM D 2863 of at least 60 and reduced smoke formation which contain 0.05-5 parts by weight and by preference 0.1-2 parts by weight per 100 parts by weight of vinyl chloride polymer of a zinc titanate that consists to a large extent, preferably to more than 50 wt.% and in particular to more than 75 wt.%, of zinc titanate possessing the spinel structure.

The spinel structure has a cubic lattice. Various modifications are known, such as normal and inverse spinels and spinels with vacant lattice sites. The term spinel structure used here comprises both the spinel structure itself and the usual modifications thereof. Zinc titanate can be readily prepared in a way known in itself by heating of zinc oxide and titanium dioxide. Various zinc titanates are known, with various zinc:titanium ratios. Which zinc titanate is substantially formed depends to a significant degree on the molecular ratio of zinc to titanium in the starting mixture and can, in addition, also depend on the temperature at which heating takes place. Besides one or more zinc titanates, the reaction product may also contain unconverted zinc oxide or titanium oxide or, in the event of incomplete conversion, both oxides.

Examples of zinc titanates with a spinel structure are $Zn_2TiO_4$ and $Zn_2Ti_3O_8$. In an application according to the invention preference is given to $Zn_2Ti_3O_8$ in view of the favourable effect thereof on the thermal stability of the vinyl chloride polymer compositions to be formed. For this reason it is preferred to use zinc titanate that consists to more than 50 wt.%, and more in particular to more than 75 wt.%, of $Zn_2Ti_3O_8$.

In the U.S. Pat. Nos. 3,880,802, 3,901,850, 3,933,742 and 3,965,068 it is stated to be possible to add $ZnTiO_3$ (zinc metatitanate) to polyvinyl chloride to reduce the combustibility. $ZnTiO_3$ has a hexagonal ilmenite structure. The zinc metatitanate alone appears to yield unsatisfactory results. It is therefore particularly surprising that zinc titanates that consist to a large extent of zinc titanate possessing a spinel structure do yield good results for the purposes set.

Mention is made of the fact that the crystal structure of the zinc titanates specified above is known from Structure Reports Vol. 26, pages 376 and 377, (1961), N.V. Oosthoek's Uitgeversmij, Utrecht, The Netherlands.

Surprisingly, relatively small amounts of zinc titanate, compared with the usual amounts of oxides or inorganic salts applied for flame retardation up to now, appear to suffice to give the vinyl chloride polymer compositions an oxygen index of at least 60.

Optionally, the vinyl chloride compositions according to the invention may also contain one or more iron compounds such as, for instance, iron oxides, iron cyanides and iron cyanid complexes, or mixtures thereof. Particularly suitable are then 0.01-1 parts by weight per 100 parts by weight of vinyl chloride polymer of one or more iron compounds, calculated as $Fe_2O_3$.

The invention covers compositions based on polyvinyl chloride, copolymers of vinyl chloride containing up to 30 mole % of one or more monomers copolymerizable with vinyl chloride and consisting to at least 70 wt.%, in particular at least 80 wt.%, of vinyl chloride polymers. Comonomers copolymerized in vinyl chloride copolymers may be alkenes with 2 to 12 carbon atoms, such as ethylene, propylene, butylene, isobutylene, etc., as well as dienes such as, for example, butadiene or isoprene. Vinyl chloride may also be copolymerized with vinyl esters and allyl esters, such as vinyl acetate, vinyl chloroacetate, vinyl propionate, vinyl butyrate, allyl acetate, etc., or with aromatic vinyl compounds, e.g. styrene, α-methyl styrene, chlorostyrene, vinyl toluene or with other monomers copolymerizable with vinyl chloride, such as vinylidene chloride, maleic acid esters, etc. Vinyl chloride may also be graft-polymerized onto a polymer base such as ethylene, propylene co- or terpolymers, ethylene-vinyl acetate copolymers, etc. The invention also covers compositions based on polymer blends of a vinyl chloride homo- or copolymer with another polymer blendable with it, such as polyvinyl chloride with polyvinylidene chloride, vinyl chloride-vinyl acetate copolymer, chlorinated poly-ethylene, post-chlorinated polyvinyl chloride, etc.

The subject polymer compositions may contain the usual additives, such as stabilizers, processing agents, e.g. lubricating agents, pigments, fillers, impact strength improving additives, etc.

The invention is elucidated in the following examples, without being restricted thereto.

EXAMPLE

Zinktitanate prepared by heating of various starting mixtures of zinc oxide and titanium oxide was introduced into a starting composition consisting of 100 parts by weight of polyvinyl chloride with a K value of 66 stabilized with 2 parts by weight of a stabilizer composition of tribasic lead sulphate, lead stearate, calcium stearate and a lubricating agent and containing 1 part by weight of calcium carbonate coated with stearic acid. Samples were prepared with various amounts of zinc titanate.

The oxygen index and the optical density were determined. The results have been tabulated below. The weight percentages are taken relative to the amount of vinyl chloride polymer in the composition.

TABLE

| experiment | wt. % of zinc titanate | largest fraction in the zinc titanate consists of | wt. % of largest fraction in the zinc titanate | $O_2$ index | optical density |
|---|---|---|---|---|---|
| 1 | 0.2 | $Zn_2TiO_4$ | >90% | 63 | 0.09 |
| 2 | 0.4 | $Zn_2TiO_4$ | >90% | 65 | 0.08 |
| 3 | 0.6 | $Zn_2TiO_4$ | >90% | 69 | 0.08 |
| 4 | 0.2 | $Zn_2Ti_3O_8$ | >80% | 62 | 0.08 |
| 5 | 0.4 | $Zn_2Ti_3O_8$ | >80% | 64 | 0.07 |
| 6 | 0.6 | $Zn_2Ti_3O_8$ | >80% | 64 | 0.07 |
| 7 | 0.8 | $Zn_2Ti_3O_8$ | >80% | 66 | 0.06 |
| 8 | 1.0 | $Zn_2Ti_3O_8$ | >80% | 67 | 0.06 |
| 9 | 1.2 | $Zn_2Ti_3O_8$ | >80% | 69 | 0.05 |
| 10 | 1.4 | $Zn_2Ti_3O_8$ | >80% | 70 | 0.04 |
| A | 0.2 | $ZnTiO_3$ | >95% | 60 | 0.18 |
| B | 0.6 | $ZnTiO_3$ | >95% | 64 | 0.18 |
| C | 0.8 | $ZnTiO_3$ | >95% | 66 | 0.17 |
| D | Polyvinyl chloride without zinc titanate | | | 48 | 0.19 |

I claim:

1. A vinyl chloride polymer composition having an oxygen index according to ASTM D 2863 of at least 60 and reduced smoke formation under conditions of fire, said composition contains a zinc titanate,
   which zinc titanate is composed to a large extent of by weight of spinel crystal structure,
   present in an amount from 0.05 to 5 parts by weight per 100 parts by weight of said vinyl chloride polymer.

2. A vinyl chloride polymer composition according to claim 1 wherein said zinc titanate is present in an amount from 0.1 to 2 parts by weight per 100 parts by weight of said vinyl chloride polymer.

3. A vinyl chloride polymer composition according to claim 1, wherein said zinc titanate consists of more than 50 wt.% of zinc titanate possessing the spinel crystal structure.

4. A vinyl chloride polymer composition according to claim 3, wherein said zinc titanate consists of more than 75 wt.% of zinc titanate possessing the spinel crystal structure.

5. A vinyl chloride polymer composition according to claim 1, wherein said zinc titanate is composed to a large extent of $Zn_2Ti_3O_8$.

6. A vinyl chloride polymer composition according to claim 5, wherein said zinc titanate consists of more than 50 wt.% of $Zn_2Ti_3O_8$.

7. A vinyl chloride polymer composition according to claim 6, wherein said zinc titanate consists of more than 75 wt.% of $Zn_2Ti_3O_8$.

8. A vinyl chloride polymer composition according to claim 1, wherein said composition also contains at least one iron compound, calculated as $Fe_2O_3$, present in an amount from 0.01 to 1 parts by weight per 100 parts by weight of said vinyl chloride polymer.

* * * * *

UNITED STATES PATENT AND TRADEMARK OFFICE
CERTIFICATE OF CORRECTION

PATENT NO. : 4,296,023
DATED : October 20, 1981
INVENTOR(S) : Hubertus J. Vroomans It is certified that error appears in the above—identified patent and that said Letters Patent is hereby corrected as shown below:

Column 1, line 42, for "L" read --$L_o$--

Signed and Sealed this

Twenty-third Day of February 1982

[SEAL]

Attest:

GERALD J. MOSSINGHOFF

Attesting Officer     Commissioner of Patents and Trademarks